United States Patent [19]

Vanek et al.

[11] Patent Number: 5,559,704
[45] Date of Patent: Sep. 24, 1996

[54] METHOD TO COMPUTE HORSEPOWER REQUIRED BY AN INTERNAL COMBUSTION ENGINE COUPLED TO AN AUXILIARY ALTERNATOR

[75] Inventors: Laurence D. Vanek, Girard; Myron L. Smith, Fairview; Ojekunle Aboyade, Erie, all of Pa.

[73] Assignee: General Electric Company, Erie, Pa.

[21] Appl. No.: 350,637

[22] Filed: Dec. 7, 1994

Related U.S. Application Data

[63] Continuation of Ser. No. 979,995, Nov. 23, 1992, abandoned.

[51] Int. Cl.$^6$ .............................. G06G 7/70; F02N 11/06
[52] U.S. Cl. .................. 364/431.01; 364/431.02; 364/431.03; 290/40 R; 290/1 R; 290/40 C; 180/65.2; 322/25; 322/11; 322/93; 307/64; 307/46
[58] Field of Search ................. 364/431.01, 431.07, 364/431.03; 60/39.281; 123/493, 339, 350; 290/45, 14, 1 R, 3, 40 B, 40 C, 40 R, 6, 31, 22, 17; 323/205, 212; 242/413.2, 414.1, 420.5; 180/65.3, 65.4, 65.2; 322/29, 32, 25, 93, 11

[56] References Cited

U.S. PATENT DOCUMENTS

| | | | |
|---|---|---|---|
| 3,749,329 | 7/1973 | Nedreski | 242/413.2 |
| 4,045,718 | 8/1977 | Gray | 322/90 |
| 4,099,589 | 7/1978 | Williams | 270/45 |
| 4,186,312 | 1/1980 | Dvorak | 290/4 |
| 4,255,782 | 3/1981 | Joyce | 363/8 |
| 4,306,156 | 12/1981 | Monaco et al. | 290/17 |
| 4,328,427 | 5/1982 | Bond | 290/3 |
| 4,482,313 | 11/1984 | Grand-Perret et al. | 290/40 R |
| 4,590,416 | 5/1986 | Porche et al. | 323/205 |
| 4,634,887 | 1/1987 | Balch et al. | 290/3 |
| 4,668,872 | 5/1987 | Lerouge et al. | 290/40 R |
| 4,719,361 | 1/1988 | Brubaker | 290/45 |
| 4,777,425 | 10/1988 | McFarlane | 322/28 |
| 5,030,898 | 7/1991 | Hokanson et al. | 318/146 |
| 5,066,866 | 11/1991 | Hallidy | 290/40 R |
| 5,070,959 | 12/1991 | Grabowski | 180/167 |
| 5,103,923 | 4/1992 | Johnston et al. | 180/65.2 |
| 5,216,350 | 6/1993 | Judge et al. | 322/25 |
| 5,266,836 | 11/1993 | Sousa | 290/31 |
| 5,280,223 | 1/1994 | Grabowski et al. | 318/139 |
| 5,373,219 | 12/1994 | Garbowski et al. | 290/14 |

*Primary Examiner*—Kevin J. Teska
*Assistant Examiner*—Jacques Louis-Jacques
*Attorney, Agent, or Firm*—Jill M. Breedlove; Marvin Snyder

[57] ABSTRACT

A method for determining gross engine horsepower of an internal combustion engine coupled in driving relationship to an alternating current electric alternator, the alternator supplying electric power to variable loads, comprises measuring the field current and average per phase armature current supplied by the alternator; computing the magnitude of electric power supplied by the alternator from the measured values of field current and armature phase current; determining the engine efficiency at the computed magnitude of electric power; and converting the computed electric power to engine horsepower at the determined efficiency.

2 Claims, 4 Drawing Sheets

METHOD TO COMPUTE HORSEPOWER REQUIRED BY AN INTERNAL COMBUSTION ENGINE COUPLED TO AN AUXILIARY ALTERNATOR

This application is a continuation of application Ser. No. 07/979,995 filed Nov. 23, 1992 now abandoned.

BACKGROUND OF THE INVENTION

The present invention relates to control systems for dynamoelectric machines and, more particularly, to a method for determining the available output power of an alternator operating at a constant speed.

Dynamoelectric machines such as alternators are used in various applications to develop electric power. In an exemplary application such as a diesel-electric locomotive, an on-board alternator is driven by a diesel engine to provide electric power to traction motors coupled in driving relationship to wheels of the locomotive and to provide electric power for other electrical apparatus in the locomotive. Electric power for such other apparatus is commonly referred to as "hotel" power and may be used to power various electric appliances designed to operate on fixed frequency, typically 60 $H_z$, alternating current (AC) power. Since the frequency of the electric power generated by the alternator is determined by the rotational speed of the alternator rotor which is driven by the diesel engine, it is desirable to operate the engine at a constant speed or RPM. In one conventional system, the engine operates at 900 RPM to produce 60 $H_z$ power from the alternator.

In locomotives, multiple alternators are coupled to an output drive shaft of the diesel engine with each alternator providing power for specific purposes. For example, one alternator may provide traction power to the traction motors, another alternator may provide power for charging batteries and still another alternator may provide the above-described hotel power. The electric power available from such alternators, given a constant RPM, is determined by the field current in field windings of the alternators. However, as additional electric power is demanded from the alternators, such demand is reflected as additional loading on the diesel engine. If the electric power demand is increased to a value which overloads the diesel engine, the engine may "bog" down. If the engine is able to maintain RPM under the overload condition, it may begin to "smoke" badly from incomplete combustion in the engine cylinders possibly damaging the engine. If the overload is such as to force a drop in engine RPM, the frequency of the hotel electric power will drop proportionately and may result in damage to the electric appliances receiving the hotel power.

In order to avoid the above disadvantages of overloading of the diesel engine/alternator power systems, such systems may include power monitors to measure the magnitude of power being drawn by such hotel loads. The diesel engine is specified to have capability of providing a maximum magnitude of electric power without overloading. Some portion of this electric power may be supplied as hotel power and the remainder supplied as propulsion power to the traction motors. In one exemplary system, the hotel power alternator may be capable of supplying up to 800 kilowatts (KW) of hotel power while the traction alternator can supply electric power to the traction motors for producing up to 2800 horsepower (HP). If the diesel engine has a maximum limit of 2800 HP, the power monitor is adapted to provide a control signal representative of the magnitude of hotel power so that the maximum available remaining power can be supplied to the traction motors, if desired, without overloading the diesel engine, thus allowing the locomotive to operate at a higher power or speed.

A disadvantage of the above described system is the requirement for a power monitor, e.g., a wattmeter, to determine the output power provided to the hotel loads. The wattmeter is relatively expensive, fragile and affected by the incessant vibration of the locomotive. Accordingly, it is desirable to provide a method for determining available traction power without use of a power monitor.

SUMMARY OF THE INVENTION

Among the several objects and advantages of the present invention may be noted the elimination of a watt meter for measuring alternator output; the use of existing voltage and current sensors to obtain data representative of alternator loading; and the use of an on-board computer on a traction vehicle for computing alternator loading. The invention is illustrated in one form as applied to a control system for a diesel-electric locomotive in which a diesel engine is connected in driving relationship to a plurality of alternators. One alternator is connected to supply electric power to at least one traction motor connected to a wheel of the locomotive. A second alternator is connected to supply constant frequency, constant voltage electric power ("hotel power") to variable loads, typically located in other train cars pulled by the locomotive. A third alternator is connected to primarily fixed loads in the locomotive, such as blowers, fans and a battery charger, such that the mechanical power to drive this alternator is determinable from pre-computed variables as a function of locomotive speed. Each of the alternators include voltage and current sensors whose outputs are connected to an on-board computer ("regulator") which regulates field current to the alternators in order to maintain a predetermined constant output voltage.

The present invention utilizes inherent characteristics of the alternators, in particular, the characteristics of the hotel power or head end alternator, to compute the load reflected by the head end alternator on the diesel engine so as to maximize the available engine power for the traction alternator without bogging down the diesel engine. To this end, the alternator characteristics are mapped to a first set of curves which plots constant power curves for constant voltage and frequency as a function of alternator field current and average phase current. The curves are converted to a set of data points which are then stored in a look-up table format in a memory of the computer. Another set of alternator characteristics which plots constant power curves for the same voltage and frequency as a function of alternator efficiency and field current are similarly stored as data points in the computer memory.

During locomotive operation, the head end alternator currents are constantly monitored and the engine power required to drive the alternator so as to maintain constant output voltage and frequency computed from the monitored currents. In particular, the computer uses the monitored field and phase currents to extract data points from memory which most nearly correspond to the monitored currents. Generally, such currents will correspond to output power values which fall between the actual stored data points. For example, data points may be stored for field current at increments of twenty amperes and for phase currents at increments of one hundred amperes. For currents between these increment values, the computer extracts values below and above the measured values and then linearly interpolates to obtain the corresponding value of power. Similarly, the efficiency characteristics are extracted based upon the interpolated power value and measured field current, again using interpolation to compute an actual or more precise efficiency.

Once the electric power output and efficiency have been computed, the horsepower required by the head end alternator is determined by dividing the computed electric power by the computed efficiency and by a watts to horsepower conversion factor of 746. The result is the actual engine power required to drive the head end alternator. This result can be subtracted from the maximum available engine horsepower to obtain the horsepower available for the traction alternator. The regulator thereafter limits the traction alternator to this available power level to avoid bogging down the engine.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
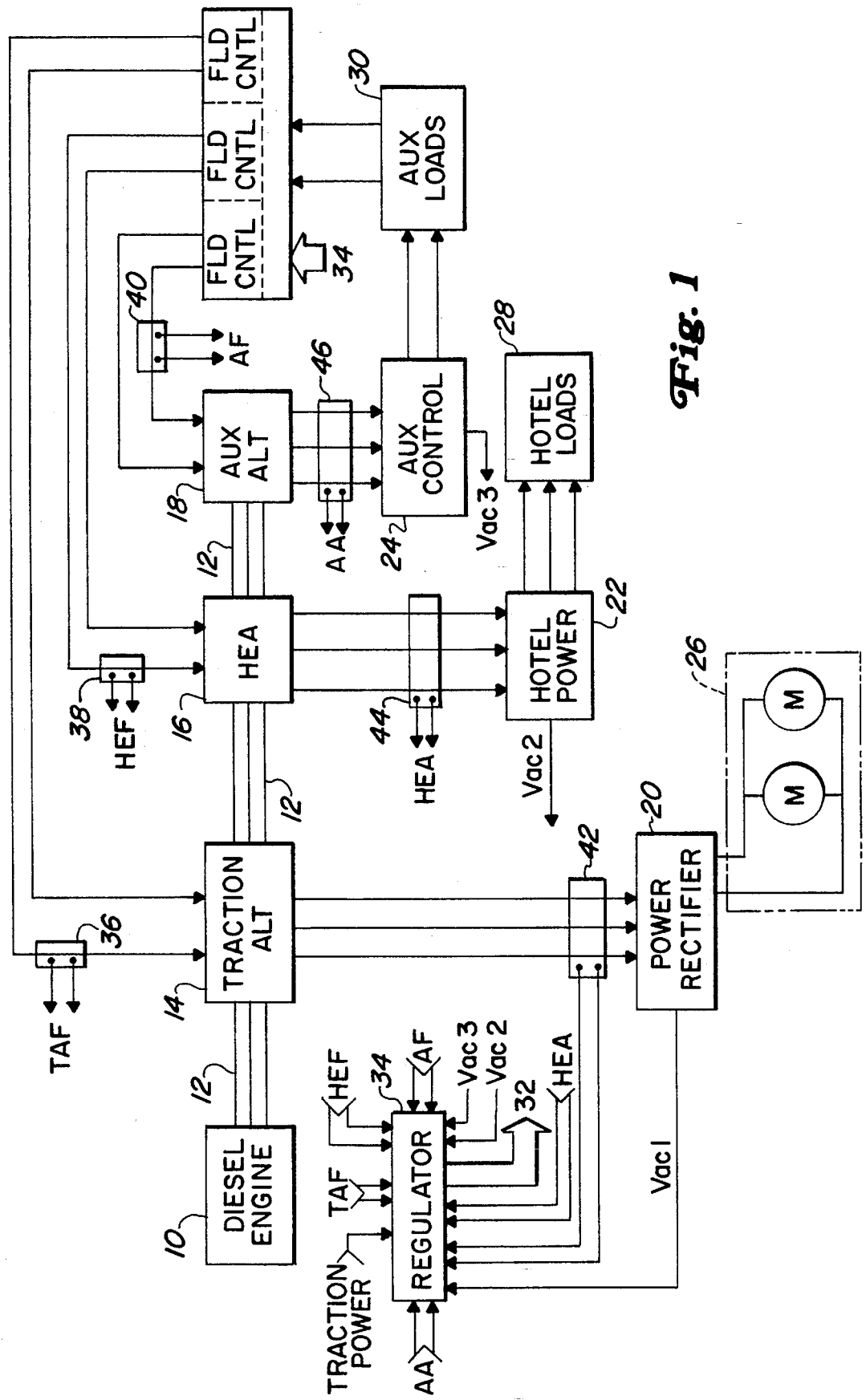
FIG. 1 is a simplified block diagram of a diesel-electric power system for an electric traction motor vehicle.

FIG. 1 is a simplified block diagram of a diesel-electric power system for a traction vehicle. A diesel engine 10 is mechanically coupled by shaft 12 to multiple alternators 14, 16 and 18. Each of the alternators 14 and 18 is electrically coupled to a respective one of the power rectifier blocks 20 and 24. Each rectifier block is electrically coupled to a respective one of the load circuits 26 and 30. Head end alternator 16 supplies AC power through hotel power block 22 to hotel loads indicated at block 28. Electrical power output from each alternator 14, 16 and 18 is regulated by field control 32 which is responsive to regulator 34. Field control 32 incorporates separate control functions for each of the field windings associated with alternators 14, 16 and 18. Regulator 34 is a microcomputer based regulator of a type well known in the art, i.e., it is programmable to establish required levels of field current in response to signals representative of commanded and measured parameters. In the prevent invention, the measured parameters include the direct current (DC) in the alternator fields, the RMS value of the alternating voltage from each of the alternators and the RMS value of the alternating current (AC) output of each alternator. Field current may be monitored by conventional DC shunts 36, 38 and 40. Output phase currents may be monitored by conventional alternating current detectors, such as current transformers, indicated at 42, 44 and 46. RMS output voltage (line-to-line) is also measured for each alternator and indicated as signals VAC1, VAC2 and VAC3 coupled to regulator 34.

In the operation of the system of FIG. 1, the diesel engine 10 is run at a constant speed, e.g., 900 RPM, in order to maintain the frequency of the AC power from head end alternator (HEA) 16 at a constant value, e.g., 60 $H_z$. Engine 10 exhibits a characteristic which allows it to produce a predetermined shaft horsepower (HP) at such constant speed without bogging, i.e., slowing or smoking from incomplete combustion. For purposes of illustration, it will be assumed that engine 10 can produce 2800 HP at shaft 12 at 900 RPM without bogging. It will also be assumed that alternator 16 can produce a maximum of 800 kilowatts (KW) which represents a maximum load of 1072 HP. The auxiliary alternator 32 provides power to various locomotive functions such as blowers for the alternators and other equipment, a radiator fan, an air compressor and a battery charger. Power supplied to the battery charger is determined by measurement of charging current while power for the other functions is generally determined from a look-up table in regulator 34 as a function of commanded locomotive speed. The additional engine load from auxiliary alternator 18 is added to the load produced by HEA 16. The difference between the loading due to alternators 16 and 18 and the available horsepower from engine 10 represents the amount of power which can be developed by alternator 14 for use by traction motors M in load 26.

Figure 2:
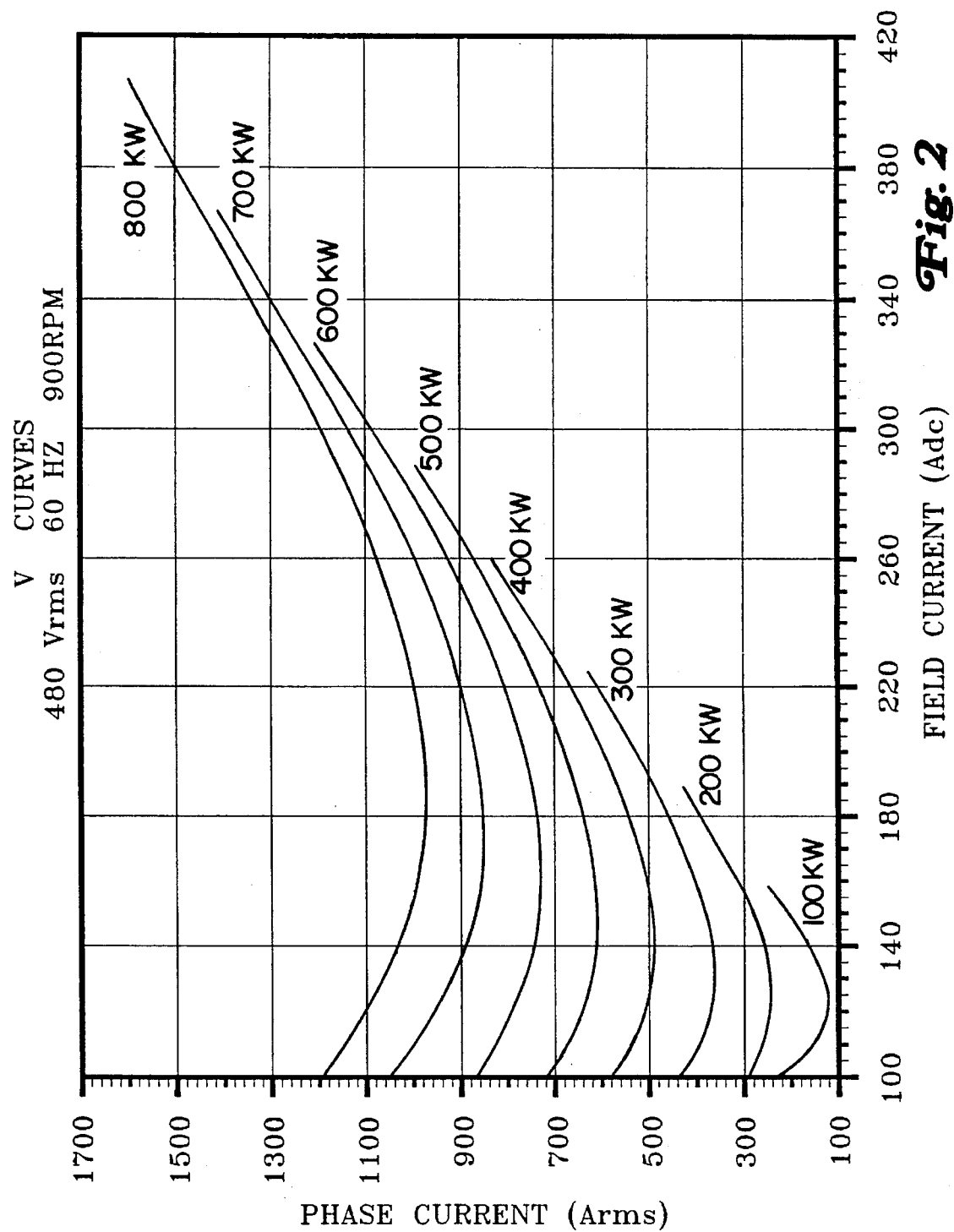
FIG. 2 is a set of characteristic power curves for an alternator.

In prior art systems it has been necessary to provide on-board watt meters to measure the power supplied by HEA 16. The present invention overcomes the need for such watt meters by using existing current and voltage monitors to provide data which is used to uniquely compute the magnitude of actual hotel load. In particular, the alternator 16, as well as other alternators, is characterized by a set of curves which depict the real DC field current as a function of AC load current for constant values of kilowatt loading. FIG. 2 illustrates a set of such characteristic curves for an exemplary alternator operating at a constant output voltage and frequency. From these curves, the measure values of field current and phase current enable a determination of the magnitude of power generated by the alternator. For example, at 140 amps of DC field current and 600 amps RMS of phase current, the alternator generates about 600 KW.

Another factor which is necessary to consider in determining the available power for traction application is the efficiency of the alternator 16 at different power levels and field currents. Efficiency data for each alternator can also be developed as a family of characteristic curves plotted in the manner shown in FIG. 3 with field current on the abscissa axis and efficiency on the ordinate axis and with each curve representing a selected power output in kilowatts. These characteristic curves are also developed for the same voltage and frequency as in FIG. 2. In the illustrative example of about 600 KW at 140 amps DC field excitation, the efficiency is about 0.970 or 97 per cent.

Figure 3:
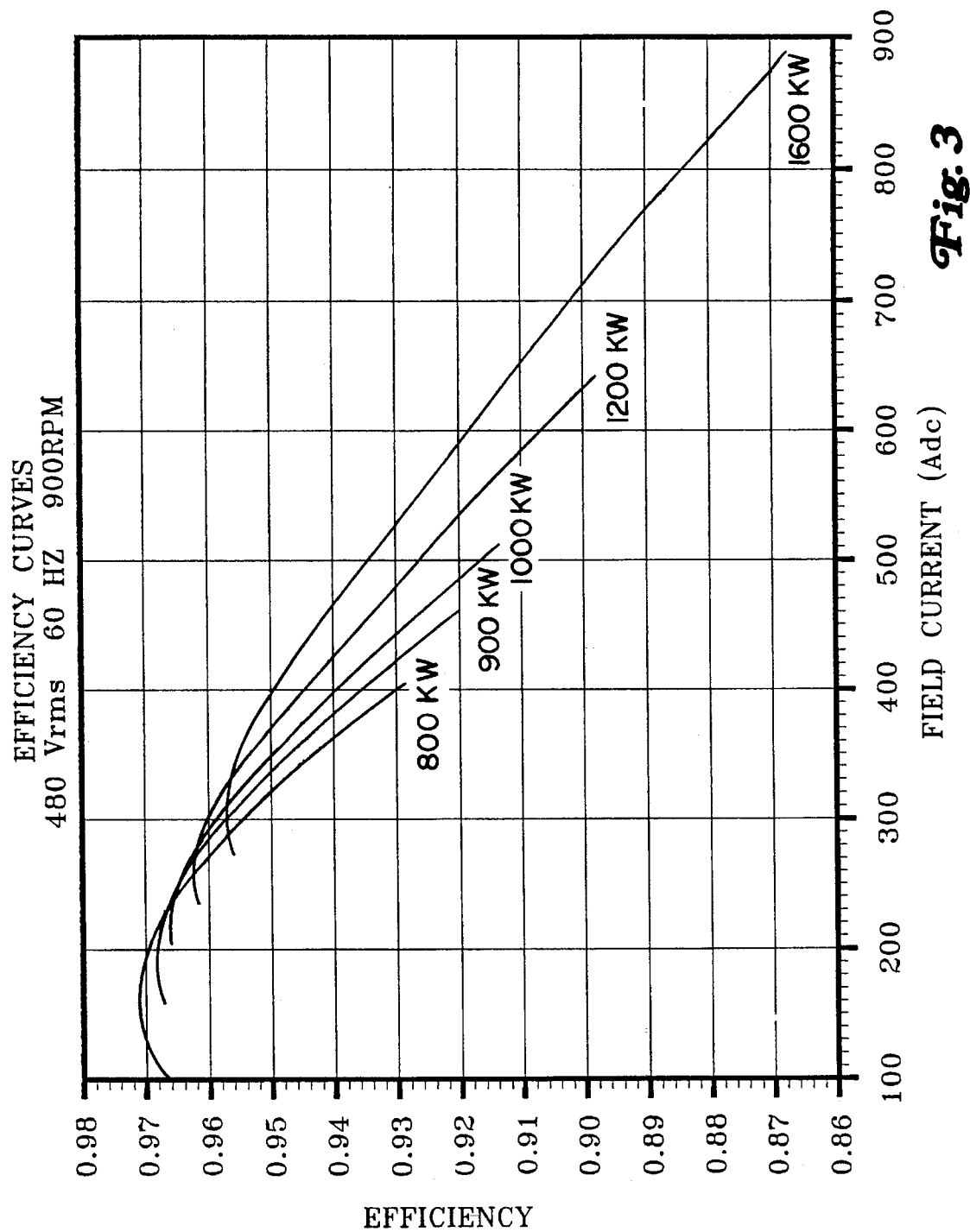
FIG. 3 is a set of characteristic efficiency curves for the alternator of FIG. 2.

From the data obtained from FIGS. 2 and 3, gross horsepower required for alternator 16 can be computed to be the net KW output divided by the alternator efficiency and then converted to HP by division by 746 KW/HP, i.e., $HP=(NET\ KW)/EFFICIENCY/746.$ For the illustrative example, the gross HP required for hotel loads is:

$HP=600/0.97/0.746 \approx 829.$

The horsepower required for the auxiliary alternator 18 is determined from tables as described above based upon locomotive speed or throttle notch position in a customary manner. It will be appreciated that the power output of alternator 18 is relatively constant at each speed position and can be determined without measurement of a widely varying load current. The value of the auxiliary alternator output is also smaller than the HEA 16 output. Assuming that alternator 18 requires a constant 200 HP, the total power required for alternators 16 and 18 is 1029 HP, leaving about 1771 HP to be used by the traction alternator 14. The control electronics in regulator 34 can therefore allow field current to alternator 14 to increase to a value sufficient to generate up to 1771 HP from the alternator without bogging down the engine 10.

The curves illustrated in FIGS. 2 and 3 can be utilized visually to obtain the data necessary to compute power required by alternator 16. However, the regulator 34 requires that the data embodied in the curves be stored in discrete increments. In a preferred method, the data is stored in look-up tables in a well known manner. In order to minimize the volume of data, values of power output are stored for 16 values of field current and 16 values of average phase current, i.e., 256 data points of output power. Values of power corresponding to currents between the selected data points are obtained by linear interpolation. Table I shows a first step in deriving a power value for the case in which the alternator 16 (operating at a fixed 480 volts RMS and 60 $H_z$) is formed to be drawing 108 amps DC field and 860 amps phase current.

TABLE I

| I PHASE = | 800 A | 860 A | 900 A |
| --- | --- | --- | --- |
| $I_{FLD}$ = 100 | 550 KW | — | 600 KW |
| $I_{FLD}$ = 108 | — | — | — |
| $I_{FLD}$ = 120 | 611.11 KW | — | 662.25 KW |

The power corresponding to 800 and 900 amps-phase current at field strength of 100 and 120 amps are taken from the look-up table within the microcomputer in regulator 34. The first step is to use interpolation to determine the power at a field current of 108 amps DC for each of 800 and 900 amps of phase current. From such linear interpolation, one arrives at the values shown in Table II.

TABLE II

| I PHASE = | 800 A | 860 A | 900 A |
| --- | --- | --- | --- |
| $I_{FLD}$ = 100 | 550 | — | 600 |
| $I_{FLD}$ = 108 | 574.44 | — | 625 |
| $I_{FLD}$ = 120 | 611.11 | — | 662.5 |

From Table II it is now possible to interpolate for the power output at 860 A phase current. The interpolated value is 574.44 KW plus sixty percent of the difference between 625 and 574.44 KW, for a value of 604.77 KW. This value is then used to create another table from stored data points corresponding to the curves of FIG. 3. The look-up table for FIG. 3 does not require the same number of data points as the table for FIG. 2. In practice, it has been found that a table of 9×12 data points is sufficient. Table III is a final interpolation table for the 604.77 KW loading of alternator 16 and shows the results of interpolation for the efficiency at the specified field current and power output.

TABLE III

| | KW = 600 | KW = 604.77 | KW = 700 |
| --- | --- | --- | --- |
| fld = 100 | 0.968 | — | 0.971 |
| fld = 108 | 0.9676 | 0.9674 | 0.971 |
| fld = 120 | 0.967 | — | 0.971 |

From Table III, it is determined that the alternator efficiency is 0.9674 at a power output of 604.77 KW. Gross power required for alternator 16 is therefore:

Power=604.77÷0.9674÷0.746=838 HP

Assuming again a constant 200 HP for alternator 18, the remaining power available for traction alternator 14 is 2800−1038 or 1762 HP.

Figure 4:
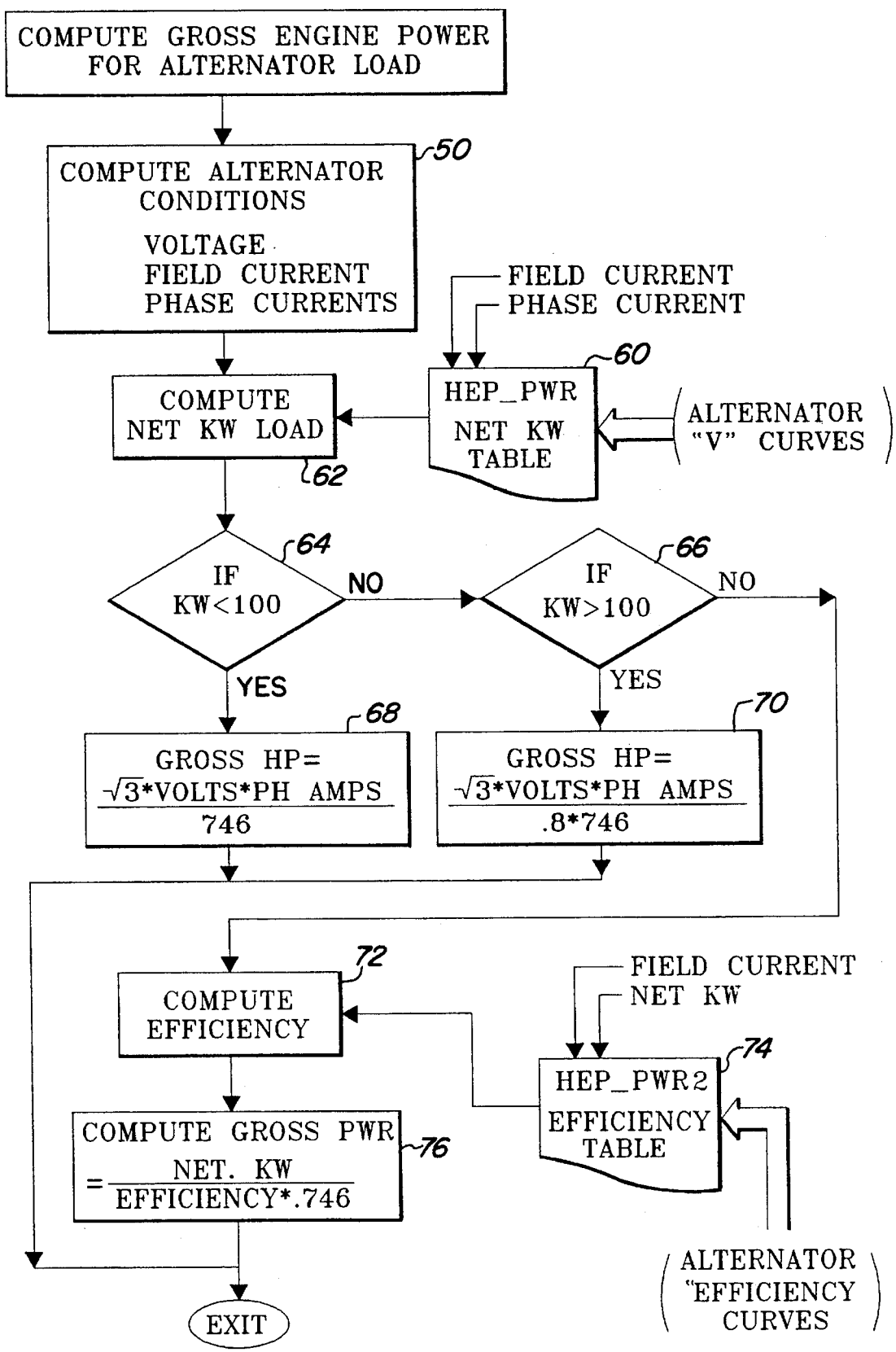
FIG. 4 is a flow chart for a method for computing alternator power requirements from measured voltage and current.

Turning to FIG. 4, there is shown a flow diagram of the method described above for determining available power for the traction motor alternator 14. In a first step, block 50, the operating conditions of alternator 16 are determined, i.e., the voltage, field current and phase current are obtained from the voltage and current sensors such as the sensors shown in FIG. 1. The values of field and phase current bracketing the measured values are then used to obtain from the net KW table, block 62, the values of KW power at the bracketing current values. The table values from block 62 are used in conjunction with the measured values of currents to interpolate to a more exact value of power in block 64, using the process described with regard to Tables I, II and III.

Once the value of KW power has been computed, the program then determines if the value is less or greater than 100 KW. If the value is less than 100 KW, block 64, or greater than 900 KW, block 66, the power is outside the range of the look-up table and an approximation calculation of power output is made. For values less than 100 KW, the calculation multiplies voltage by average current per phase times the square root of three to obtain KW power and then divides by 746 to convert to HP, block 68. The same equation is used for power output greater than 900 KW except that an efficiency of 0.8 is assumed, block 70. These two calculated values are then used as the actual value of power required by alternator 16.

If the value of electric power produced by alternator 16 is between 100 and 900 KW, the problem steps to block 72 to compute efficiency. Again, the values of KW power and field current are used as entries to the look-up table, block 74, to obtain the bracketing values as described with regard to Table III. These values are loaded to block 72 which uses linear interpolation to derive actual efficiency. With efficiency computed, the program steps to block 76 to compute gross power by dividing the net kilowatt value by efficiency and the KW to HP conversion factor of 746.

What is provided by the above method is a means of eliminating the costly watt meter used in the past to measure alternator output. Instead, the method uses existing voltage and current data to compute output power. In this method, alternator characteristic curves are stored in conventional look-up table format within the microcomputer in regulator 34. The microcomputer is programmed to extract the look-up table data and to compute the electric power output and required horsepower from such data. The computed horsepower is then used in the same manner as in the past to determine available power from the engine 10 which can be supplied to the traction alternator 14.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A method for determining gross engine horsepower required by an internal combustion engine coupled in driving relationship to an auxiliary alternating current electric alternator, the auxiliary alternator supplying electric power to variable loads with variable power factors, and for determining available horsepower remaining for another alternator coupled to the engine, the engine having a predetermined maximum horsepower capability at a selected RPM, the method comprising the steps of:

measuring field current and average per phase armature current supplied by the alternator;

computing magnitude of electric power supplied by the alternator from the measured values of field current and armature phase current by developing a set of constant power characteristic curves representative of alternator performance as a function of field current and phase current, converting the constant power characteristic curves into a set of data points suitable for storage in a computer memory, extracting data points from memory most closely corresponding to the measured values of field and phase currents, and interpolating from the extracted data points to a value of electric power actually corresponding to the measured values of field and phase current;

determining engine efficiency at the computed magnitude of electric power by developing a set of alternator efficiency characterisitics for selected electric power outputs as a function of alternator efficiency and field current, converting the efficiency characteristics into a set of data points suitable for storage in a computer memory, extracting efficiency data points from memory most nearly corresponding to the computed electric power output and measure field current, and interpolating from the extracted efficiency data points to a value of efficiency actually corresponding to the computed electric power and measure field current;

converting the computed electric power to engine horsepower at the determined efficiency; and subtracting the converted engine horsepower from the maximum horsepower capability for determining the available horsepower remaining for said another alternator.

2. The method of claim 1 and including the further steps of:

determining whether the computed magnitude of electric power is within a range bounded by a preselected low magnitude and a preselected high magnitude;

for magnitudes of power less than the preselected low magnitude, computing alternator power by multiplying alternator output voltage by average phase current times the square root of three; and for magnitudes of power greater than the preselected high magnitude, computing alternator power by multiplying alternator output voltage by average phase current times the square root of three divided by an assumed efficiency of about 0.8.

* * * * *

UNITED STATES PATENT AND TRADEMARK OFFICE
CERTIFICATE OF CORRECTION

PATENT NO. : 5,559,704

DATED : September 24, 1996

INVENTOR(S) : Laurence D. Vanek

It is certified that error appears in the above-indentified patent and that said Letters Patent is hereby corrected as shown below:

In Fig. 4, block 66, change "100" to --900--.

Signed and Sealed this

Eighteenth Day of March, 1997

Attest:

BRUCE LEHMAN

Attesting Officer

Commissioner of Patents and Trademarks